United States Patent [19]

Smisson

[11] Patent Number: 4,747,962
[45] Date of Patent: May 31, 1988

[54] SEPARATION OF COMPONENTS OF A FLUID MIXTURE

[75] Inventor: Bernard Smisson, Bristol, England

[73] Assignee: Hydro International Limited, England

[21] Appl. No.: 733,863

[22] Filed: May 14, 1985

[30] Foreign Application Priority Data

May 14, 1984 [GB] United Kingdom ................ 8412228

[51] Int. Cl.$^4$ .......................... C02F 1/38; B01D 21/26
[52] U.S. Cl. .................................. 210/788; 210/512.1; 210/805
[58] Field of Search ...................... 210/787, 788, 512.1, 210/194, 304, 320, 519, 805; 209/211; 55/459 R, 459 C, 459 D

[56] References Cited

U.S. PATENT DOCUMENTS

| | | | |
|---|---|---|---|
| 2,364,405 | 12/1944 | Trimbey et al. | 210/512.1 |
| 3,277,926 | 10/1966 | Skardal | 210/512.1 |
| 3,529,724 | 9/1970 | Maciula et al. | 210/304 |
| 3,784,009 | 1/1974 | Maciula | 210/304 |
| 3,802,570 | 4/1974 | Dehne | 210/304 |
| 3,965,013 | 6/1976 | Jackson | 210/519 |
| 4,094,783 | 6/1978 | Jackson | 210/512.1 |
| 4,170,555 | 10/1979 | Vicard | 210/512.1 |
| 4,357,242 | 11/1982 | Chandler | 210/512.1 |
| 4,414,112 | 11/1983 | Simpson et al. | 210/512.1 |
| 4,447,322 | 5/1984 | Zajdlik | 210/304 |
| 4,451,366 | 5/1984 | Smisson | 210/512.1 |
| 4,519,848 | 5/1985 | Underwood | 210/512.1 |
| 4,532,034 | 7/1985 | Hans et al. | 210/512.1 |

FOREIGN PATENT DOCUMENTS

| | | |
|---|---|---|
| 627941 | 9/1961 | Canada . |
| 0047135 | 3/1982 | European Pat. Off. . |
| 53-47153 | 4/1978 | Japan . |
| 56-43365 | 10/1981 | Japan . |
| 8202344 | 7/1982 | PCT Int'l Appl. . |
| 712792 | 7/1954 | United Kingdom . |
| 734460 | 8/1955 | United Kingdom . |
| 999848 | 7/1965 | United Kingdom . |
| 1036543 | 7/1966 | United Kingdom . |
| 2082941 | 3/1982 | United Kingdom . |
| 867422 | 9/1981 | U.S.S.R. . |

OTHER PUBLICATIONS

"Miniature Hydrocyclones-Part 1-Energy Requirements," *Chem. Eng. Progress*, (vol. 54, No. 12), Dec. 1958.

Primary Examiner—Richard V. Fisher
Assistant Examiner—Linda S. Evans
Attorney, Agent, or Firm—Larson and Taylor

[57] ABSTRACT

A separator comprises a vessel having an outer wall (2) and an end wall (3). A body (14) adjacent the end wall (3) defines with the end wall (3) an annular opening (15). In use, a mixture of, for example, water and solid material is introduced into the vessel through a first inlet (4). A circulating motion takes place in the vessel and the solid material falls to the end wall (3) and is removed through the opening (15) to an outlet (6) while clean water flows from the top of the vessel through an outlet (8). In order to increase the energy in the lower region of the vessel so as to assist removal of the solid material, water from the outlet (8) is passed through a pump (P) and reintroduced as energizing fluid to the vessel through a recirculating port (44). Energizing fluid may be taken from sources other than the outlet (8). Various alternative forms of separator are disclosed.

6 Claims, 6 Drawing Sheets

SEPARATION OF COMPONENTS OF A FLUID MIXTURE

This invention relates to the separation of components of a fluid mixture and particularly, although not exclusively, to the separation of solids from a liquid.

BACKGROUND OF THE INVENTION AND PRIOR ART

Our U.S. Pat. No. 4,451,366 corresponding to British Pat. No. 2,082,941, discloses a separator which is particularly suitable for separating, for example, sewage and other solid matter from water in stormwater overflows. The separator is in the form of a cylindrical vessel having an inlet which is disposed tangentially so as to promote a circulating flow within the vessel. This circulating flow comprises an outer, relatively fast flow and an inner, relatively slow flow, the shear zone between these two regions being stabilized by an annular dip plate which projects downwardly from the top of the vessel. A flow-modifying member is provided in the vessel to enhance the removal of solid particles accumulating at the bottom of the vessel to a central outlet. Clean water is removed from the top of the vessel.

Because the separator disclosed in U.S. Pat No. 4,451,366 was originally designated for use in stormwater overflows, the two principal requirements were that it should operate at low energy levels (i.e. with a low pressure head at the inlet) and that it should be maintenance free. The latter requirement means that the use of moving parts, and in particular of active energy sources such as pumps, has hitherto been avoided. Consequently the energy input to the known separator has been derived entirely from the kinetic energy of the flow into the vessel.

Two somewhat distinct processes take place in the known separator. Firstly, solid matter in the incoming mixture is allowed to fall out of the liquid (usually water), so achieving separation of the solid matter from the liquid. Contrary to what might initially be thought, centrifugal forces resulting from the circulating flow of the mixture in the vessel play an insignificant part in this separation process. Separation occurs almost entirely under the force of gravity acting on the particles, and to achieve a high separation efficiency the vessel is designed so that each "packet" of mixture entering the vessel travels along the longest possible path before reaching one of the outlets, so allowing enough time for the solid particles to fall to the base.

The second process which takes place in the separator is the removal from the vessel of the solid matter which reaches the base. This removal process is achieved under the action of boundary layer effects at the base of the vessel; solids reaching the base are entrained in the laminar sub-layer at the base and progress, usually in the form of migrating dunes, towards the center of the vessel. In the separator of U.S. Pat. No. 4,451,366, the flow-modifying member assists this migration by creating an inwards sweeping effect through an annular slot defined between the flow modifying member and the base of the vessel.

In the design of the known separator, there is an inherent conflict in the dual requirement for efficient separation and efficient solids removal. Separation efficiency is improved by positioning the inlet at a relatively high level, and preferably above the lower edge of the dip plate. Separation efficiency is also improved by extending the dip plate downwardly for a considerable distance, for example for 75% of the total height of the vessel. However, extending the dip plate in this way gives rise to a considerable energy loss owing to friction effects at the surface of the dip plate. Furthermore, when running at optimum separation efficiencies, the energy available for solids removal decreases to very low values, and blockage of the solids outlet can become a problem. Experience with the known separator has shown that there is a very rapid drop in velocity between the inlet and the base. It will be appreciated that energy losses will be greater as the viscosity of the fluid in the vessel increases. For efficient solids removal, the intake should be positioned low down the vessel to transfer as much energy into the boundary layers at the base as is possible. The dip plate should be as short as possible to reduce friction energy loss. It is not possible to meet these conflicting requirements with the separator disclosed in U.S. Pat. No. 4,451,366, and that separator is consequently a compromise with the intake disposed substantially halfway down the vessel, and with a relatively short dip plate.

One way of increasing the energy input and operating head is to throttle the inlet. However, at very low flow rates, sufficient energy to establish the correct flow pattern in the vessel can only be achieved by reducing the area of the inlet to such an extent that particles in the inlet flow can block the inlet. Furthermore, it is not entirely certain that the achievement of the correct flow pattern in the vessel is dependent solely on the kinetic energy input. It is believed that angular momentum may also be a significant influence.

SUMMARY OF THE INVENTION

According to the present invention there is provided a separator comprising a vessel having a cylindrical outer wall and an end wall at one end, a body being provided in the vessel and defining with the end wall an annular opening which is spaced from the outer wall, the vessel being provided with a first inlet, for introducing a fluid into the vessel, and energizing means for imparting energy to fluid in the vessel in a manner to create or enhance rotational movement of fluid within the chamber.

The energizing means may comprise a second inlet for introducing an energizing fluid into the vessel.

The first inlet may be directed tangentially to create the rotational movement within the chamber; energizing fluid flowing through the second inlet then enhances this rotational movement. One or both of the inlets may be provided in the outer wall of the vessel. They may be at different levels from each other, in which case the first inlet is preferably disposed above the second inlet. For example, the first inlet may be at or above a position halfway down the vessel, the second inlet being at or below this halfway position, preferably close to the end wall.

In a preferred embodiment, means is provided for imparting momentum to fluid passing through the second inlet. This means may, for example, be a pump, but alternatively the fluid passing through the second inlet could be taken from a pressurized source such as a water main.

The energizing fluid may be the same fluid as passes to the first inlet, some of this fluid being diverted from the first inlet to the second inlet. In other embodiments the energizing fluid may be taken from the fluid within the vessel, for example from the outlet or from the top of the vessel or from a recirculation port provided in the outer wall of the vessel.

The annular opening may be the mouth of an annular channel defined between the body and the end wall. The base of the channel may comprise the surface of a member which connects the body to the end wall. The annular channel may be provided with an outlet port.

According to another aspect of the present invention there is provided a separator for separating components of a fluid mixture, comprising a vessel having a cylindrical outer wall and an end wall at one end, a body being provided within the vessel and being connected to the end wall by a member having an outer surface which surrounds the axis of the vesel, the body projecting radially outwardly beyond the outer surface of the member so that the body, the member and the end wall define an annular channel, this channel being provided with an outlet opening.

The body may have a passage to permit flow through it generally axially of the vessel, but alternatively the body may be solid. The outlet opening may be provided in the part of the end wall defining a wall of the annular channel, or it may be provided in the member defining the surface which forms the base of the channel. In the latter case, the outlet may communicate with a central sump or discharge line. In both cases, the outlet may extend tangentially of the vessel.

DETAILED DESCRIPTION OF PREFERRED EMBODIMENTS

Figure 1:
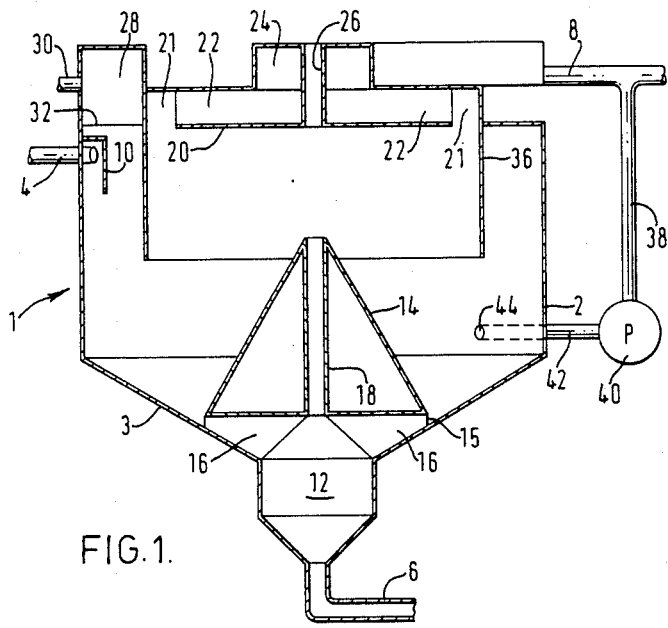
FIG. 1 is a sectional view of a separator.
Figure 2:
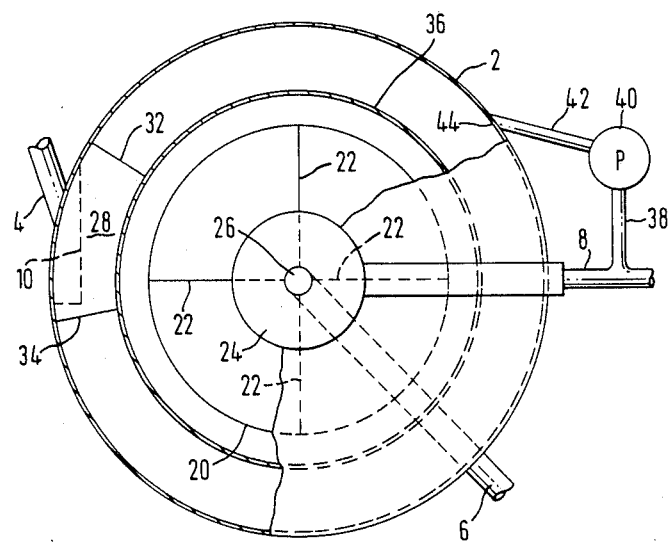
FIG. 2 is a partly sectioned plan view of the separator of FIG. 1.

The separator illustrated in FIGS. 1 and 2 comprises a cylindrical vessel 1 defined by an outer wall 2 and an end wall or base 3. The vessel 1 has a main inlet 4 and two outlets 6 and 8. The inlet 4 (see particularly FIG. 2), is directed somewhat tangentially so as to promote a circulating flow or swirl within the vessel 1. This effect is enhanced by a deflector plate 10. It is possible for more than one main inlet to be provided in the wall 2 at the deflector plate 10. The inlets may be disposed one above the other. The flow will circulate about a swirl axis which can be considered to coincide with the central axis of the vessel, although fluctuating conditions will mean that this will not always be the case. The inlet 4 may extend exactly tangentially of the wall 2, although it is shown in FIG. 2 as being offset from the tangential. The angle of offset may be up to 45°.

The outlet 6 constitutes a solids outlet. As shown in FIG. 1, the base 3 opens into a sump 12, which in turn discharges into the outlet 6. There may be a shut-off valve in the outlet 6. Separated solids will be deposited in the sump 12 in the form of a sludge, and may be discharged intermittently, for example into a mobile tanker. In cases where continuous solids discharge is possible, the sump 12 may be dispensed with.

Above the outlet 6 there is a flow modifying member or body in the form of a cone 14. The cone 14 is supported on the base 3 by support plates 16. There is an upwardly extending passage 18 through the cone 14. The vertex angle of the cone 14 is 60° in the embodiment illustrated, and its dimensions are such that the base of the cone terminates at a position approximately half way between the central axis of the vessel 1 and the outer wall 2, at which region it defines with the base 3 an annular opening 15. The end wall 3 has a slope of 30°, which means that the cone 14 and the end wall 3 are at right angles to each other. Of course, these angles may be changed to meet different circumstances.

At the top of the chamber 2, there is a baffle plate 20 supported by plates 22 which act as flow spoilers for clean liquid (for example, water) flowing to the outlet 8. On its way to the outlet, the clean water, as indicated at 21, passes upwardly between the outer edge of the baffle plate 20 and a dip plate 36 (to be described later), and then flows radially inwardly through an annular slot defined between the baffle plate 20 and the top of the vessel. This reduces the possibility of solid material entering the clean water outlet 8, since such solid material will tend to accumulate near the swirl axis. The outlet 8 extends from an annular chamber 24, which may or may not be closed at the top. An aperture 26 extends through the chamber 24 and the baffle plate 20 to provide access for a cleaning rod which can be passed through the passage 18 and the sump 12 to dislodge solid matter which may adhere to these parts.

At the top of the vessel near the outer wall 2 there is floatables trap 28 and a floatables outlet 30. The floatables trap 28 comprises a bottom wall 32 and an end wall 34, the construction being such that any solid matter floating to the top of the vessel is carried round into the trap 28, from which it may be discharged through the outlet 30. In FIG. 2, the floatables trap is shown disposed opposite the outlet 8, but the trap 28 could be disposed anywhere around the circumference of the vessel 1.

An annular dip plate 36 projects downwardly into the chamber 2 from the top wall. As with the dimensions of the cone 14, the position and axial extent of the dip plate 36 must be determined empirically. Its function is to create, or stabilize, a shear zone between an outer, fast-flowing flow and an inner, slower-flowing flow of the mixture in the vortex chamber.

A line 38 is branched from the clean water outlet 8 so that some of the flow through the outlet 8 is diverted to a pump 40. The outlet of the pump 40 is connected by a pipe 42 to a secondary inlet 44. As shown in FIG. 2, the pipe 42 extends tangentially of the chamber, like the main inlet 4. A deflector plate, similar to the deflector plate 10 for the main inlet 4, may be provided for the secondary inlet 44.

In operation as part of a stormwater overflow system, storm water containing sewage and other solid matter is directed into the vessel 1 through the main inlet 4. This creates a circulating flow in the chamber 2 which exists, with the assistance of the dip plate 36, as the outer and inner flows mentioned above. The flow is such that non-floatable solid matter falls to the base 3 and then migrates inwardly under the influence of boundary layer effects at the base 3. Eventually the solid matter passes through the opening 15 and between the plates 16. Some solid matter will, however, be deposited on the outer surface of the cone 14, and the flow will tend to move these deposits slowly up the cone 14. The cone 14 has the effect of creating a secondary flow which circulates upwardly through the passage 18, and then downwardly again over the surface of the cone 14 and between the plates 16. Deposits climbing up the outer wall of the cone 14 will eventually be entrained in this flow and so repeatedly pass between the plates 16 until eventually they are deposited in the sump 12. At the upper end of the vessel, clean water passes through the slot 21 and between the plates 22 into the annular chamber 24 and out of the outlet 8. Under some conditions, this water will be clean enough to pass directly to any acceptable outfall, such as a tidal outfall. Any floatable solids which will not be passed to the outlet 6 will be caught in the trap 28 and can then either be mixed with the solids issuing from the outlet 6 or else disposed of separately.

It will be appreciated from FIG. 1 that the inlet 4 is positioned near the top of the vessel 1, well above the lower edge of the dip plate 36. The dip plate 36 terminates more than half way down the cylindrical wall 2. While such a configuration achieves efficient separation, there is a danger that, when operating at low energy levels, there will be insufficient energy adjacent the base 3 to cause the settled solid matter to migrate through the opening 15 to the sump 12. As a result, the solid matter will accumulate in shoals or dunes and eventually block the opening 15, so further reducing the rate of removal of solids.

To avoid this problem, some of the flow through the outlet 8 is diverted to the pump 40 through the pipe 38, the pumped water then being supplied through the pipe 42 back to the vessel 1 through the secondary inlet 44. This recirculated water imparts additional energy to the flow in the chamber 1 which increase its angular momentum at the base 3. The additional energy accelerates the movement of shoals towards the opening 15, or even prevents shoaling altogether.

It will be appreciated that, in spite of the addition of energy, the speed of swirl in the vessel 1 remains low. In particular, the speed of swirl is sufficiently low to prevent centrifugal forces from becoming predominant over gravitational forces. In most circumstances, centrifugal forces will play a negligible part in separating the components of the mixture. It is envisaged that the peripheral velocity at the outer periphery of the base 3 will not exceed 3 meters per second.

Figure 3:
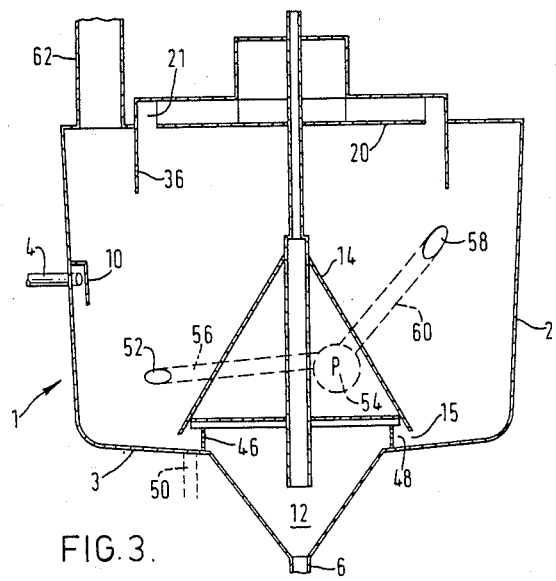
FIG. 3 is a sectional view of another embodiment of a separator.
Figure 4:
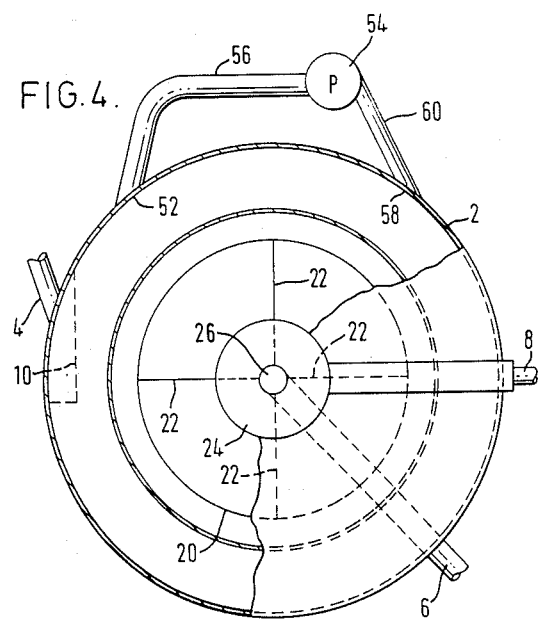
FIG. 4 is a partly sectioned plan view of the separator of FIG. 3.

FIG. 3 shows an alternative construction of which the main components correspond to those of FIGS. 1 and 2. These components are given the same reference numerals as in FIGS. 1 and 2 and will not be described again. In the construction of FIGS. 3 and 4, the cone 14, instead of being supported by the plates 16, is supported by a member in the form of a circular wall 46. There is no passage corresponding to the passage 18 in the cone 14 of the embodiment of FIGS. 1 and 2, and the cone 14 may therefore constitute a solid body. Another difference is that the base 3 has a relatively shallow downwards slope towards the axis of the vessel, and may be substantially flat, at least near the central axis. This has the advantage that, where the separator is to be installed in an excavated site, the depth of the excavation need not be a great as is required for the embodiment of FIGS. 1 and 2.

The cone 14 overhangs the wall 46, with the result that the cone 14, the wall 46 and the base 3 define an annular channel 48, the mouth of which is constituted by the annular opening 15. The wall 46 may be provided with one or more apertures (not shown) to permit flow from the channel 48 into the sump 12. Alternatively, the end wall 3, where it partially defines the channel 48, may be provided with one or more outlets as indicated at 50, in which case the sump 12 is not required and the excavation depth referred to above can be reduced still further. The outlet or outlets 50 may extend tangentially from the end wall in the swirl direction.

As well as the main inlet 4, there is also a secondary inlet 52 which is connected to the discharge side of a pump 54 by a pipe 56. The inlet side of the pump 54 is connected to a recirculation port 58 by a pipe 60. The secondary inlet is positioned near the base 3, while the recirculation port 58 is positioned at a relatively high level in the outer wall 2. The port 58 and the secondary inlet 52 could, however, be at the same level as each other.

In use of the embodiment of FIGS. 3 and 4, the mixture to be separated is introduced, as before, through the main inlet 4. In order to overcome the problem of lack of energy at the base 3, with consequent shoaling of accumulated solid matter and blockage of the outlet 50 or the apertures in the wall 46, some of the mixture is extracted from the boundary layer at the outer wall 2 through the recirculation port 58, accelerated by the pump 54, and reintroduced through the secondary inlet port 52. This increases the angular momentum of the mixture at the bottom of the chamber 1, so improving solids removal in the manner described with reference to the embodiment of FIGS. 1 and 2. The solids migrate into the annular channel 48, which serves as a collecting zone, and then pass through the outlet 50 or through the apertures in the wall 46. Once in the collecting zone, the solids are effectively isolated from the main flow in the vessel 1.

A further inlet 62 is indicated in FIG. 3. This inlet can serve as the main inlet instead of the inlet 4, for example if the separator is to be used as a treatment or reaction vessel in a batch process, rather than as a continuous separator. In use of the separator in a batch process, reagents are introduced into the vessel 1 through the main inlet 62, and the rotational flow is established solely by the recirculation of the reagents by means of the pump 54. During this process, the reagents react with each other to produce a precipitate which falls to the base 3 and is removed through the outlet 50 or the apertures in the wall 46. It may be possible, for example, to control the particle size of the precipitate by suitable control of the pump 54. For example, the pump may be operated for a predetermined time to establish the required flow in the chamber 1, after which time the pump may be shut down. The flow in the chamber 1 will then gradually slow down causing the solids to settle and be removed after a predetermined reaction time in the chamber 1.

Apart from chemical processes as mentioned above, the principle of the separator of FIGS. 3 and 4 may be applicable to fish farming, fresh water being supplied at the top of the vessel at low energy. The circulating flow would cause fish faeces and excess food to be separated from the flow and removed via the annular channel 48.

Figure 5:
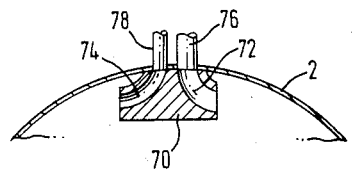
FIG. 5 is a fragmentary view showing an alternative form for part of the separator of FIGS. 3 and 4.

FIG. 5 shows an alternative construction to replace the ports 52 and 58 and the pipes 56 and 60 of FIGS. 3 and 4. Instead, a single opening is formed in the wall 2, the hole being covered on the inside by a block 70. The block is provided with two passages 72 and 74 which are connected outside the vessel to pipes 76 and 78 which are connected, respectively, to the inlet and outlet of a pump similar to the pump 54 of FIGS. 3 and 4. In operation, mixture is drawn from the vessel through the passage 72 and the pipe 76, and is accelerated by the pump and returned to the vessel through the pipe 78 and the passage 74, to add energy to the flow within the vessel. The embodiment of FIG. 5 is particularly suitable for modifying existing separators to provide the facility to introduce additional energy into the flow, since only a single water-tight connection to the wall 2 is required.

Figure 6:
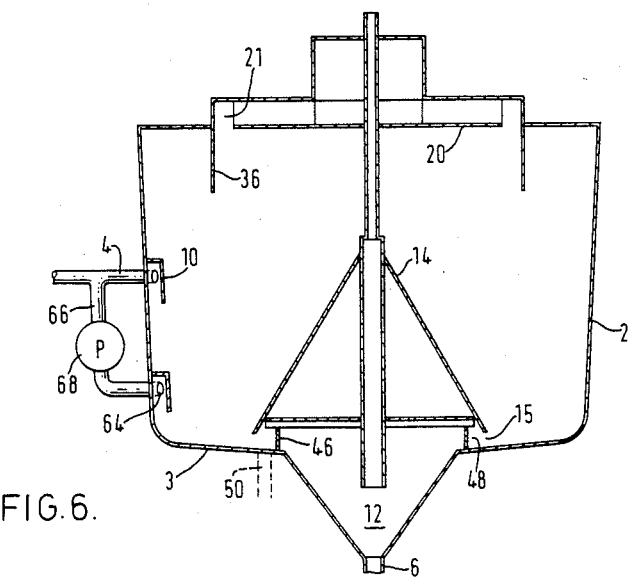
FIG. 6 is a separator similar to the separator of FIG. 3.

A third embodiment is shown in FIG. 6, which corresponds substantially to the embodiment of FIGS. 3 and 4. In the embodiment of FIG. 6, the secondary inlet 64 takes substantially the same form as the main inlet 4, and is supplied by means of a branch line 66 from the main inlet 4. A pump 68 may be provided, but this is not necessary in all cases. By positioning the inlets 4 and 64 at different levels, the two objectives of efficient separation and efficient solids removal can be achieved.

In all three embodiments, flow through the secondary inlet can be maintained continuously, or can be established intermittently to disperse shoals which may have accumulated during normal operation of the separator.

As indicated above, many variations are possible in the construction of the various parts of the separators described with reference to FIGS. 1 to 6. Some possible variations will now be discussed with reference to FIGS. 7 to 21. Parts corresponding to parts shown in FIGS. 1 to 6 are designated in FIGS. 7 to 21 even where they differ in some respects.

Figure 7:
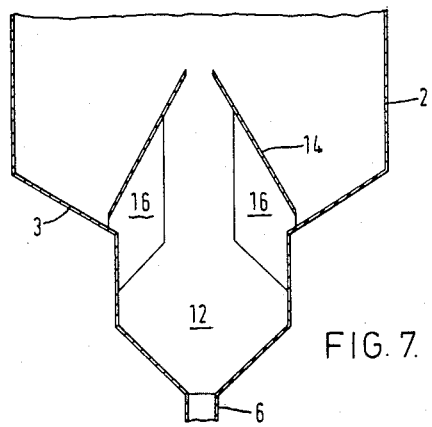
FIGS. 7 and 8 show alternative constructions for the lower part of a separator.

In FIG. 7, the cone 14 comprises merely the outer conical wall of the cone of FIG. 1, without any of the internal structural parts defining the base of the cone and the passage 18. The cone is supported on the base by support plates 16 which extend both into the sump 12 and for some distance up the inner face of the cone 14. The support plates 16 extend radially with respect to the swirl axis, and act to still the rotation of the flow with the result that the sump 12 provides a collecting and consolidation zone which is substantially quiescent.

Figure 8:
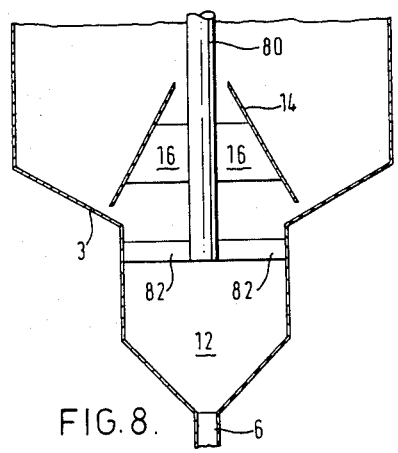

By contrast, the cone 14 of FIG. 8, although of substantially the same form as the cone of FIG. 7, is supported, not by the base 3, but from a central column or tube 80. The cone 14 is connected to the column 80 by support plates 16. The lower end of the column 80 is stabilized by struts 82 which connect the column 80 to the outer wall of the sump 12. In the embodiment of FIG. 8, rotation of the flow is maintained in the zone beneath the cone 14 and within the sump 12. This means that solids in the sump 12 are inhibited from settling and consolidating, which, with some materials, could cause clogging.

Figure 9:
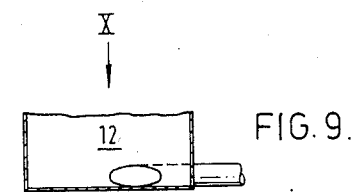
FIG. 9 is a fragmentary view showing an alternative construction for part of the embodiments of FIGS. 7 and 8.
Figure 10:
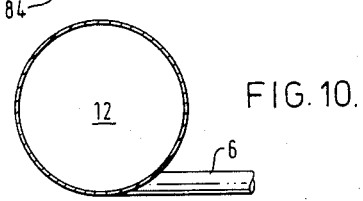
FIG. 10 is a view taken in the direction of the arrow X in FIG. 9.

FIGS. 9 and 10 show an alternative configuration for the sump 12. Instead of the conical lower end of the sumps shown in the preceding Figures, the sump of FIGS. 9 and 10 has parallel outer walls terminating at a horizontal base 84. A tangential outlet 6 extends from the outer wall of the sump adjacent the base 84. The configuration of FIGS. 9 and 10 is particularly suitable for use in separators in which rotation of the fluid is maintained within the sump 12. It also enables the total depth of the separator to be reduced.

Figure 11:
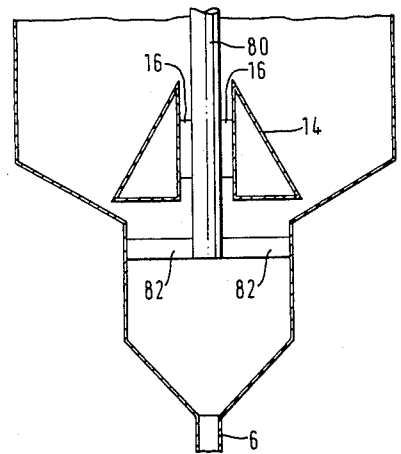
FIGS. 11 to 17 show further alternative constructions for the lower part of a separator.

FIG. 11 shows a construction corresponding to that of FIG. 8, although a solid cone, corresponding to that of FIG. 1, is used.

Figure 12:
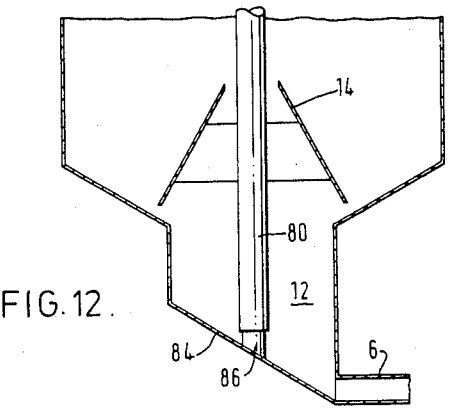

In FIG. 12, the central column, instead of being stabilized by the struts 82 of Figures 8 and 11, is stabilized on a spigot 86 provided on the lower wall 84. In the embodiment of Figure 12, the lower wall 84 is inclined, with the result that collected solids fall to a horizontal outlet 6 extending from the lower point of the sump 12.

Figure 13:
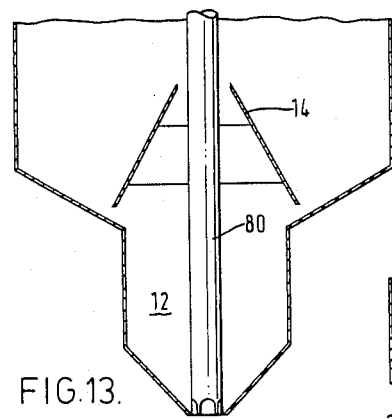

In the embodiment of FIG. 13, the sump has no outlet 6. Instead, the central column 80, which must be tubular in this embodiment, is used to extract solids collecting in the sump 12. Collected solids can be discharged either continuously or periodically by pumping them vertically upwards through the column 80 using either air lifts or pumps. This construction avoids the need for deep underflow outlet pipes.

Figure 14:
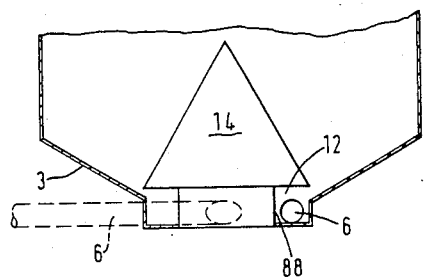
Figure 15:
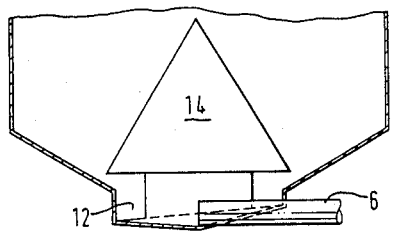
Figure 16:
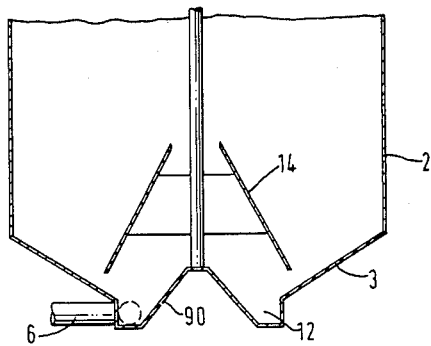

FIG. 14 shows a solid cone supported on the floor of the vessel by a solid pedestal 88. The cone 14 and the pedestal 88 define with the lower wall of the vessel an annular sump 12. A number of outlet pipes 6 (for example four) extend tangentially from the sump 12. FIG. 15 shows a similar embodiment, except that the floor of the annular sump 12 has a helical shape in order to assist the travel of solids particles to the outlet 6.

The embodiments of FIGS. 14 and 15 have solids collecting zones of reduced height, which means that less excavation is required to install the separator. The same facility is provided by the embodiment of FIGS. 16, where the lower wall of the vessel has an upwardly extending conical portion 90 which, again, provides an annular sump 12 from which one or more outlets 6 extends.

Figure 17:
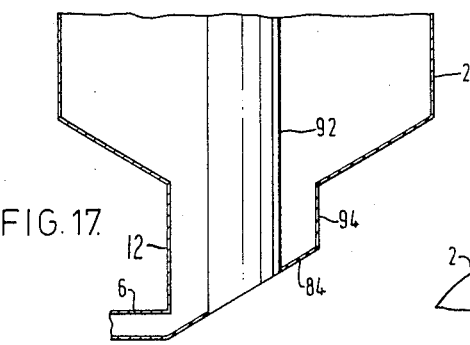

FIG. 17 does not have a cone 14. Instead, there is a vertical column 92 which defines, with an outer wall 94, an annular sump 12 having an inclined lower wall 84. The configuration of Figure 17 is particularly suitable when the device is intended for use as a sludge thickener, since narrow orifices or slots which could be clogged by the sludge are avoided.

Figure 18:
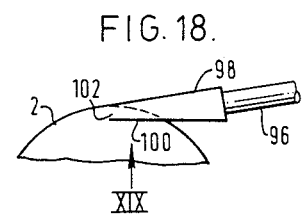
FIG. 18 is a plan view in the direction of the arrow XIX in FIG. 18.
Figure 19:
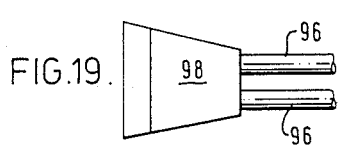

FIGS. 18 and 19 show a possible configuration for the main inlet 4. It will be appreciated that a similar configuration could be used for the secondary inlet 44. As shown in FIG. 18 two inlet pipes 96 open into a common box manifold 98 which is connected to the outer wall 2 of the vessel. One wall of the box 98 extends into the vessel to provide a deflector portion 100. The manifold box 98 terminates at a vertical outlet slot 102 through which, in use, the incoming fluid passes tangentially of the vessel. It will be appreciated that the manifold box 98 tapers as viewed in plan (FIG. 18) and flares as viewed from the side (FIG. 19). This configuration both accelerates the incoming flow and causes it to fan out over the wall 2 as the flow enters the vessel. The angle between the pipe 96 and the tangent to the wall 2 may vary between 0° and 45°. Also, the deflector portion 100 may be omitted, with both side walls of the manifold box 98 terminating at the wall 2.

Figure 20:
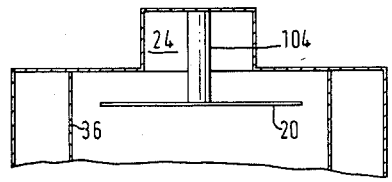
FIGS. 20 to 22 show alternative constructions for the top part of a separator.
Figure 21:
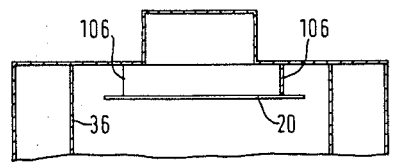
Figure 22:
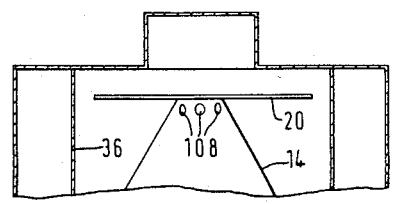

FIGS. 20 to 22 show alternative ways of mounting the baffle plate 20. In FIG. 20, the baffle plate 20 is suspended from the top of the vessel by a support tube 104. With this construction the rotation of the flow within the vessel is maintained above the baffle plate, and consequently the outlet 8 should extend tangentially, rather than radially as shown in FIG. 2. If the construction of FIG. 20 is used, for example, with the embodiment of FIG. 8, the support tube 104 may be constituted by the upper end of the column 80. Alternatively, the support tube 104 may surround the upper end of the column 80.

In the embodiment of FIG. 21, the baffle plate 20 is suspended from the top of the vessel by a plurality of support elements 106. These support elements 106 may be streamlined to ensure that circulation energy from the main part of the vessel is carried over into the zone above the baffle plate 20.

In the embodiment of FIG. 22, the baffle plate 20 is supported on the top of the cone 14. Clearly, this construction is possible only where the vessel has a relatively small height or where the cone 14 has a relatively steep angle. It it is intended that upwards flow through the cone 14 is to be permitted (as, for example, in FIGS. 1 and 7), then it will be necessary to provide a series of apertures 108 at the top of the cone 14.

It will be appreciated that many of the various alternatives shown in FIGS. 7 to 22 can be used in various combinations with each other. It is also pointed out that many of the variants can be used in separators which do not have the facility of adding energy to the fluid within the vessel.

By improving the efficiency of solids removal without lowering the separation efficiency, the possible use of the separator can be extended beyond the primary use in sewage treatment and storm water overflows into further areas of application. For example, the separator can be used to separate out heavy solids which do not move easily over the base, such as sand, gravel and mineral ore and for separation of the products of chemical processes. The separator can also be used in applications where the solids tend to form a thick sludge which does not behave as particulate matter but more as a non-newtonian viscous fluid or which may even set hard if allowed to come to rest. Examples of such applications are in sludge thickening, farm waste treatment and in gypsum separation.

By way of numerical example, tests have shown that where flow through the secondary inlet is greater than 50% of the total through flow rate of the separator, the effect is to stir up deposits on the base and clear any dunes which have formed Some remixing of the solids into the main flow in the separator takes place which tends to reduce separation efficiency. However, this effect can be advantageous in some applications, for example in ore-enrichment, since stirring and remixing would tend to increase the carry-over of the less dense but readily settlable material, leading to better quality ores at the outlet (for example the outlet 6).

Where flow is supplied intermittently through the secondary inlets at flow rates greater than 50% of the total through-flow rate of the separator, the effect is to stir up and dissipate deposits without seriously affecting overall separation efficiency. As well as intermittent injection, pulsed injection could be used to provide even more effective dispersal of deposits.

Where the rate of flow through the secondary inlets is continuous at rates of from 5 to 50% of the total throughflow rate, there is a marked improvement in solids removal efficiency without any serious reduction in separation efficiency.

The height of the vessel, measured between the baffle plate 20 and the bottom of the outer wall 2 is preferably in the range 0.4 to more than 3 times the diameter. The range 0.4 to 1 times the diameter is more suitable for separation while the range 1.5 to 3 times the diameter is more suitable for sludge thickening.

It will be appreciated that, in the embodiments of FIGS. 1 and 2 and FIGS. 3 and 4, the recirculated liquid introduced through the secondary inlets 44 and 52 will be relatively free of solids, since it is taken from the outlet 8 or from relatively high up the vessel. The separation efficiency consequently does not suffer from the addition, close to the base 3, of further solids.

I claim:

1. A method of separating the solid components out of a liquid mixture, the method comprising:
    introducing a liquid mixture tangentially into a vessel having cylindrical outer walls and oppositely disposed end walls, via a first tangential inlet, said liquid mixture containing the solid components to be separated, said liquid mixture being introduced at a relatively low pressure head, and said liquid moving rotationally about the cylindrical vessel, such that separation of the solids occurs primarily by gravity,
    collecting a portion of the liquid associated with the vessel, including at least one of (1) liquid being introduced into the vessel, (2) liquid being removed from the vessel or (3) liquid within the vessel itself and imparting energy to that collected liquid by means including a pump;
    introducing into the vessel, via a second tangential inlet, the energized collected liquid to create or enhance rotational movement of the liquid within the region of the base of the vessel, said rotational movement being sufficient to cause or enhance an inward sweeping effect toward a first outlet on solids accumulated at the base of the vessel, while being of sufficiently low energy that separation of the solids components in the liquid is brought about primarily by gravity;
    causing a portion of the liquid mixture with the separated settled solids to pass through an annular opening defined between a body in the vessel and one end wall of the vessel;
    and removing the settled solids from the liquid mixture from the vessel via the first outlet disposed in the one end wall of the vessel.

2. A method as claimed in claim 1, wherein the step of imparting energy comprises introducing an energizing fluid into the vessel.

3. A method as claimed in claim 1, wherein at least one of the first and second inlets is provided in the outer wall of the vessel.

4. A method as claimed in claim 1, in which the first and second inlets are provided at different positions along the axis of the outer wall.

5. A method as claimed in claim 4, in which the axis of the outer wall is substantially vertical, and in which the first inlet is disposed above the second inlet.

6. A method as claimed in claim 5, in which the first inlet is at or above a position halfway down the vessel and the second inlet is disposed at or below that halfway position.

* * * * *